Figure 1:
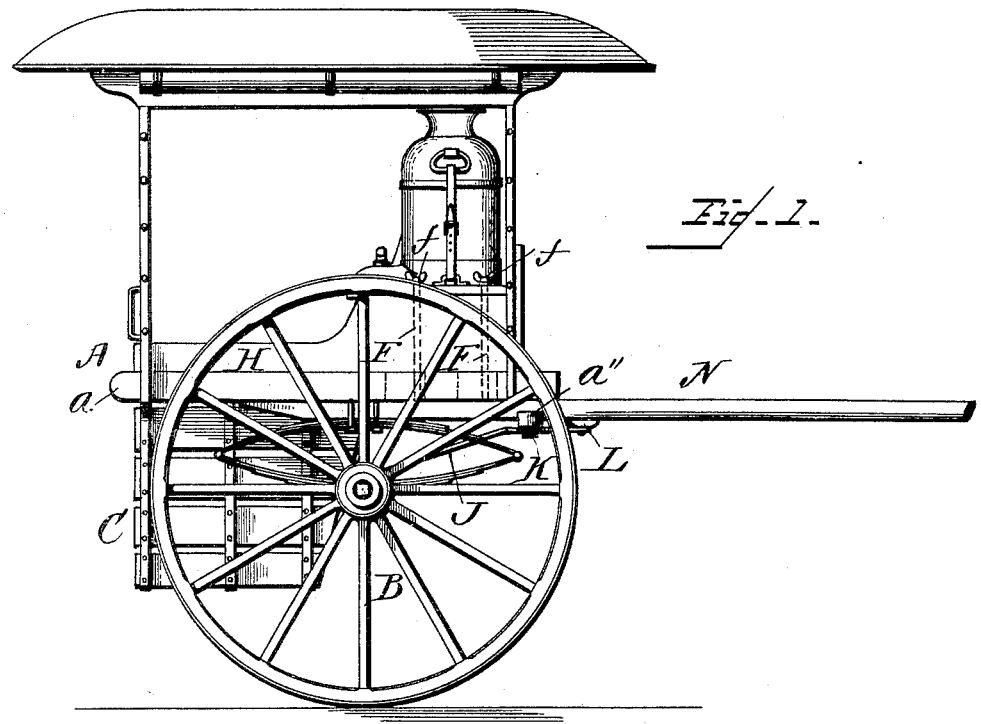

(No Model.) 2 Sheets—Sheet 1.

M. B. BOONE.
TWO WHEELED DELIVERY VEHICLE.

No. 467,912. Patented Feb. 2, 1892.

Witnesses

Inventor
Manly Breaker Boone
By his Attorney Woodbury Lowery

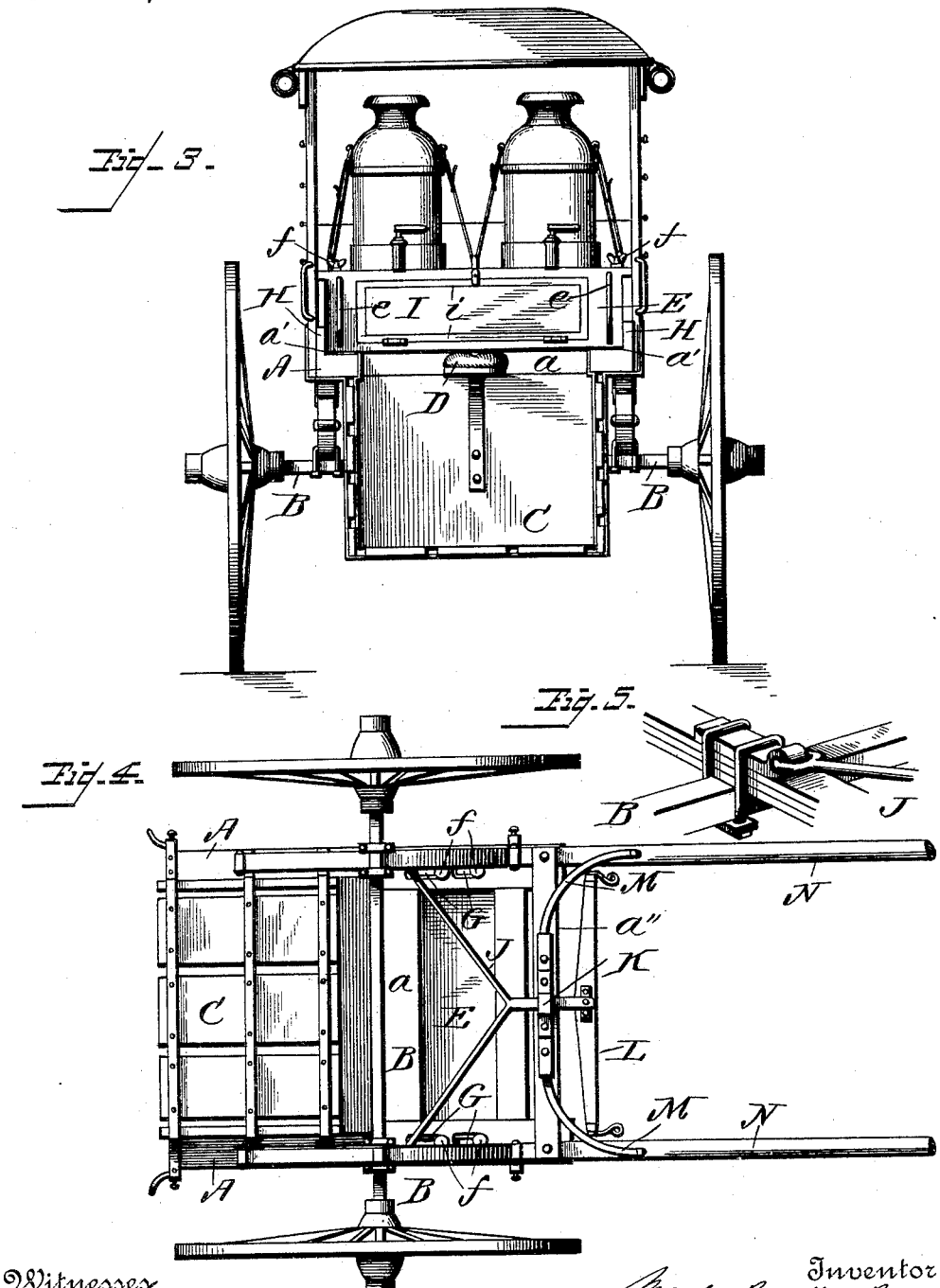

UNITED STATES PATENT OFFICE

MANLY BREAKER BOONE, OF GALVESTON, TEXAS.

TWO-WHEELED DELIVERY-VEHICLE.

SPECIFICATION forming part of Letters Patent No. 467,912, dated February 2, 1892.

Application filed June 12, 1891. Serial No. 395,997. (No model.)

*To all whom it may concern:*

Be it known that I, MANLY BREAKER BOONE, a citizen of the United States, residing at Galveston, in the county of Galveston and State of Texas, have invented a new and useful Improvement in Two-Wheeled Delivery-Vehicles, of which the following is a specification.

The object of my invention is to provide a light and convenient vehicle for the use of mail-collectors in cities, and for the transportation and delivery of parcels, milk, or other articles in which the mail or parcel receptacle may be readily removed and replaced, and it is adjustably located on the front of the frame in full sight of and readily accessible to the driver to balance the weight of the rear of the vehicle; and my invention consists of a wagon frame or body supported on the axle of the two wheels, having on the rear of the frame a rearwardly-open drop-box by which access to the interior of the vehicle is attained, a seat located centrally and lengthwise the drop-box, and a case or receptacle mounted in front of the axle on the wagon-frame removable at the rear of the vehicle by sliding in guides and adjustably secured in place in front of the axle to balance the weight of the drop-box at the rear of the axle.

In the drawings forming part of my specification I have showed my invention as applied to a milk-delivery cart, in which the milk-cans are represented as placed in the removable box, which may contain the ice or other cooling-mixture; but I do not limit myself to its use for such purpose alone, as it may be employed in a great variety of ways for the purposes of transportation and delivery.

Figure 2:
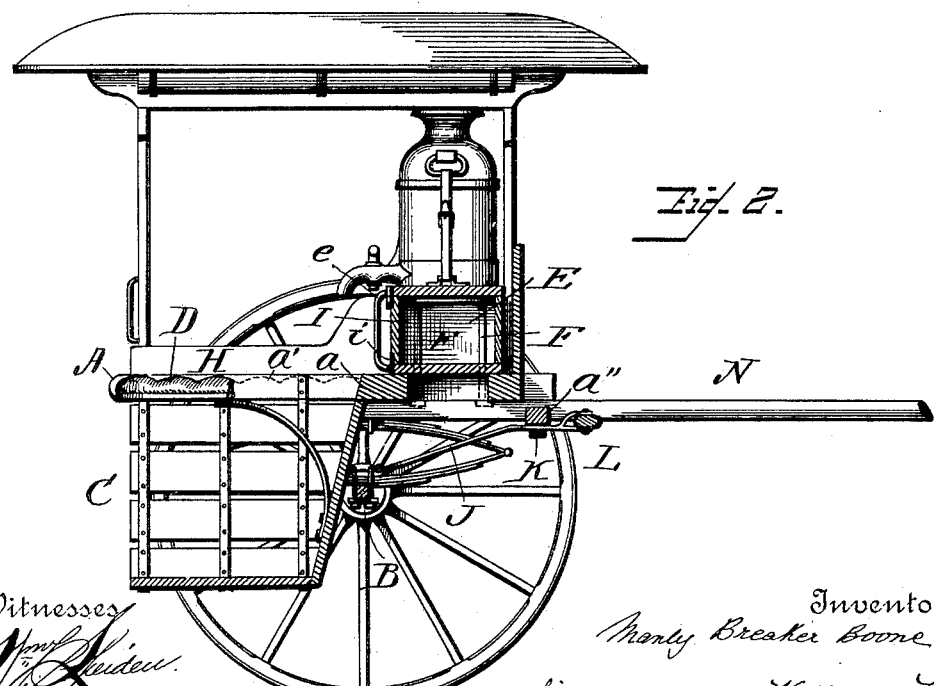

In the accompanying drawings, which illustrate my invention, Figure 1 is a side view of the vehicle. Fig. 2 is a cross-section of the same. Fig. 3 is a rear view; Fig. 4, a bottom view of the same. Fig. 5 is a detail of the axle-brace attachment.

A is the wagon-frame mounted on the axle B.

C is a drop-box suspended from the frame A back of the axle and open to the rear.

D is the driver's seat projecting back from the cross-piece $a$ of the frame through the center of the drop-box C and not rising above the level of the sills $a'$ $a'$ of the wagon-frame.

E is a box resting upon the forward ends of the sills $a'$ $a'$ of the frame in front of the axle, to which it is secured by means of one or more bolts F and thumb-screws $f$, passing through the sides of the box and down through longitudinal slots G in the sills $a'$ of the frame.

H H are strips secured to the outer edge of the sills $a'$ $a'$ the entire length of the latter and forming therewith guides or slides by which the box E is removed at the rear of the vehicle after the bolts F have been withdrawn.

The box E is provided with a lid I, having a metal band $i$ around its edge to prevent the sifting of dust into the box, and has handles $e$ $e$ by which it is moved when desired.

In Fig. 4, J is a V-shaped axle-brace, the tongue of which, after passing through the loop K on the forward cross-piece $a''$ of the frame, is attached to the singletree L in a well-known way. M M are the shaft-braces, and N N the shafts.

The operation of my invention is as follows: The box E, having been packed with the desired article, is slid into place over the guides formed by the wagon-sills $a'$ $a'$ and the strips H H, passes easily over the seat, which may be placed at such a level as to serve as an adtional support in sliding in the box, if so desired, and is finally secured in place by means of the bolts and thumb-screws passing through the box and the slots G after having been so adjusted in respect to the axle as to counterbalance the weight of the rear part of the vehicle, the necessary variation in position being permitted by the longitudinal slots in the sills. I thus secure a two-wheeled vehicle having great adaptability for the easy transportation of a variety of loads without the carrying of any unnecessary additional weight.

The box is carried with the greatest economy of room in full view of and immediately accessible to the driver without moving from his seat—an obvious advantage in the transportation of valuable packages—while the loading and unloading of the box and mounting and dismounting from the vehicle are accomplished with the least possible obstruction and without removing the seat.

I do not limit myself to the particular form of the guides shown for sliding the box into position, neither to the particular means for securing the adjustment of the box in respect to the weight of the drop-box in the rear, or the particular means of locking it in position, as these details may be widely varied without departing from the spirit of my invention; but

What I claim as new, and desire to secure by Letters Patent, is—

1. In a two-wheeled vehicle, the combination, with the frame of the vehicle, of a drop-box in the rear of the axle, a removable box located in front of the axle, and guides extending the length of the vehicle to convey the box to its place, substantially as described.

2. In a two-wheeled vehicle, the combination, with the frame of the vehicle, of a drop-box in the rear of the axle, a removable box located in front of the axle, guides extending the length of the vehicle to convey the box, and an adjusting device for adjusting the position of the box in front of the axle, substantially as and for the purpose described.

3. In a two-wheeled vehicle, the combination, with the frame of the vehicle, of a drop-box in the rear of the axle, a seat extending centrally the length of the drop-box, a removable box located in front of the axle, and guides extending the length of the vehicle to convey the box to its place, substantially as described.

4. In a two-wheeled vehicle, the combination, with the frame of the vehicle, of a drop-box in the rear of the axle, a seat extending centrally the length of the drop-box, a removable box located in front of the axle, guides extending the length of the vehicle to convey the box to its place, and an adjusting device for adjusting the position of the box in front of the axle, substantially as described.

5. In a two-wheeled vehicle, the combination, with the frame of the vehicle, of the axle, the V-shaped axle-brace, the loop secured to the front of the frame, the singletree secured to the tongue of the axle-brace, the shafts secured to the frame, and the shaft-braces secured to the front of the frame and the shafts, substantially as described.

In testimony whereof I have hereunto set my hand in the presence of two subscribing witnesses.

MANLY BREAKER BOONE.

Witnesses:
FARRELL DABNEY MINOR,
CALVIN C. PETTIT.